United States Patent [19]

Bischoff et al.

[11] Patent Number: 5,288,775

[45] Date of Patent: Feb. 22, 1994

[54] MOLDABLE BUILDING MATERIAL COMPOSITES

[75] Inventors: Robert K. Bischoff, Quincy; Eugene A. Witzleben, Tallahassee, both of Fla.

[73] Assignee: Fiberstone Quarries, Inc., Quincy, Fla.

[21] Appl. No.: 867,567

[22] Filed: Apr. 13, 1992

[51] Int. Cl.$^5$ .......................... C08K 3/00; C08K 3/30; C08L 1/02

[52] U.S. Cl. .......................... 524/2; 524/5; 524/13; 524/34; 524/35; 524/423

[58] Field of Search .................. 524/2, 5, 745, 425, 524/13, 714, 35, 34, 423; 528/67; 522/16

[56] References Cited

U.S. PATENT DOCUMENTS

| | | | |
|---|---|---|---|
| 2,806,008 | 9/1957 | McNulty | 524/5 |
| 3,827,869 | 8/1974 | Bonin et al. | 524/5 |
| 3,878,278 | 4/1975 | Miller et al. | 428/312.4 |
| 3,887,748 | 6/1975 | Swedenberg et al. | 524/5 |
| 3,947,398 | 3/1976 | Williams | 524/5 |
| 4,031,285 | 6/1977 | Miller et al. | 428/295 |
| 4,126,599 | 11/1978 | Sugahara et al. | 524/5 |
| 4,175,975 | 11/1979 | MacWilliams et al. | 524/5 |
| 4,238,239 | 12/1980 | Brown | 524/5 |
| 4,267,092 | 5/1981 | Glaser et al. | 524/5 |
| 4,525,500 | 6/1985 | Lynn | 524/5 |
| 4,530,954 | 7/1985 | Arpin | 524/425 |
| 4,543,377 | 9/1985 | Crossman | 524/13 |
| 4,729,853 | 3/1988 | von Bonin | 523/179 |
| 4,746,365 | 5/1988 | Babcock | 524/5 |
| 4,748,771 | 6/1988 | Lehnert et al | 428/920 |

*Primary Examiner*—Paul R. Michl
*Assistant Examiner*—Peter Szekely
*Attorney, Agent, or Firm*—Dowell & Dowell

[57] ABSTRACT

Acrylic polymer composites which are moldable to form building veneers, panels, facades, decorative trims, planters and the like which include natural cellulose fibers, alpha-gypsum, melamine resin, hardening agents, inert fillers and water.

20 Claims, No Drawings

MOLDABLE BUILDING MATERIAL COMPOSITES

BACKGROUND OF THE INVENTION

1. Field of the Invention

This invention is generally directed to moldable synthetic or plastic building materials of the type utilized for decorative facing, veneers, building facades, panels, decorative trim, planters and the like, and more particularly, to moldable building material composites formed of acrylic polymers in which natural cellulose fibers are blended in order to obtain an end product which is not only water resistant and therefore suitable for both interior and exterior uses, but also an end product which exhibits substantial structural integrity. The products molded from the composites of the present invention exhibit sufficient strength and rigidity to be self-supporting and securable to other substructural elements utilizing conventional fasteners including nails and screws. The formed products may have a variety of surface characteristics so as to simulate quarried stone including coral, natural travertine, limestone, dolomite, or fossil rock.

2. History of the Related Art

In an effort to create lightweight and durable building components which simulate natural building materials, such as stone, efforts have been made to utilize various plastic polymers and resins including acrylic polymers to form moldable panels, veneers, decorative trimming, and the like. One such composite material which can be molded to form such construction elements is Jemonite TM, which is a formulated plaster resin composite which is glass fiber reinforced and is marketed by Forton BV, under license from Parnel Kraft-Benncroft Ltd. The composite plaster resin is moldable to form products having a variety of surface finish characteristics and is particularly suitable for interior uses but is also capable of exterior applications when the end product is coated or sealed. Jemonite TM is a water base thermoset acrylic including 50% polymer solid and 50% water. A modified glass fiber reinforced gypsum is blended with the acrylic, together with melamine resin solids and ammonium chloride as a hardening agent. The structural integrity or strength of units formed from the composite is provided by adding type "E" fiberglass roving and chopped strands to the composite prior to molding. In some instances, continuous strand and surface veil mats are used when hand laminating panels from the acrylic resin. It has been noted, however, that the end products such as veneers and decorative wall panels formed often exhibit brittleness which makes it difficult to mount them to substructures utilizing conventional tools such as air driven nails or screws. In addition, the use of the glass fiber within the molded composite produces environmental drawbacks not only during the molding but when handled during construction. Due to the brittleness of the Jemonite TM material, it has not been possible to form large sheets of durable veneers without the likelihood of cracks being produced when the sheets are impacted by fasteners.

SUMMARY OF THE INVENTION

The present invention is directed to improved moldable acrylic resin composites which may be utilized to form building or architectural veneers, facades, trims, and other freestanding items including planters and the like, wherein an acrylic polymer having between approximately 30 to 70% solids, in solution is present in the composites in a range of from approximately 19% to 35%, by weight. An alpha-gypsum is also present in the composite together with natural cellulose fibers. The natural cellulose fibers are blended into the composites in amounts, by dry weight, of approximately 3% to 15%, with the fibers generally being presoaked with water which may be present in an amount from 200 to 400%, by weight of the fiber. Non-reactive fillers, such as vermiculite, are thereafter utilized to adjust the consistency of the composites and the weight of finished molded products. In an effort to increase resistance to moisture so that the composites may be utilized to form structures for exterior use, melamine resins may be added to the composite in amounts of up to approximately 10%, by weight, together with suitable hardening agents.

The composites of the present invention may be molded either by hand pouring into mold cavities, pumping with peristaltic or similar pumps into mold cavities, or by spraying the material into the mold cavities. In some instances, the composites may be vibrated or tamped within the molds to insure the removal of all air. Due to the nature of the polymers and resins utilized, it is possible that the products can be removed from molds within approximately 1 to 1½ hour, with these times being shortened through the use of various chemical accelerators.

It is a primary object of the present invention to provide synthetic plastic polymer composites which incorporate natural cellulose fibers which enable the resulting composites to be utilized without the need for structural reinforcement and which further permits the composites to be molded into veneers, trim strips and related structures which may be attached to substructural framing utilizing conventional fasteners such as nails and screws without fracturing the material during installation.

It is yet another object of the invention to provide natural cellulose fiber reinforced acrylic polymer composites which may be molded to form trim strips, veneers, facade coverings or molded into self-supporting structures including planters, tables, trays and the like wherein the material is generally environmentally safe containing no hazardous elements such as fiberglass.

DESCRIPTION OF THE PREFERRED EMBODIMENT

The present invention is directed to moldable acrylic polymeric composites which are utilized to form wall veneer systems, trim products, and freestanding specialty items including planters, display shelving and the like, which simulate quarried stone in their surface finishes. Such products are designed to replace natural stone products which are expensive, difficult to handle and extremely labor intensive to form and to install.

The basic polymeric material utilized within the teachings of the present invention is preferably an acrylic polymer of a hard, high molecular cross-linking type which normally requires a chemical hardener and which exhibits a minimum film forming temperature of 48° F. (9° C). One example of such an acrylic polymer is FORTON VF 812 which contains 50% solids in a water base emulsion. Although FORTON VF 812 contains 50% solids, acrylic polymers containing 30 to 70% solids can be utilized within the teachings of the present invention. However, ranges closer to 50% of polymer solids in emulsion are preferred. The acrylic polymers should be present in amounts between 19% to 35% as an emulsion, within the final composites.

The moldable composites also include alpha-hemihydrate gypsum such as DENSITE, a product of Georgia Pacific, or FGR, a product of U.S. Gypsum Corporation, which should be present in the composites in amounts between approximately 35 to 71%. Added to the composites are natural cellulose fibers which function to promote structural strength and yet some flexibility within the final molded products. The natural cellulose fibers should be present in amounts between about 3% to 15%, by weight of the composite, and should preferably be formed of fibers of lengths of ¼ to approximately 2 inches. During testing it has been found that cotton linter fibers exhibit particularly good characteristics within the composites. However, other natural fibers including virgin and recycled paper, wood, cotton and other vegetable fibers may be utilized and are within the teachings of the present invention.

Generally, the fibers are mixed with water prior to being blended with the remaining composite materials. The fibers may also be premixed with the acrylic polymer emulsions which allows the fibers to be thoroughly impregnated by the acrylic polymer prior to being blended into the composite material thereby insuring preservation of the fibers throughout the life of the molded product. The percentage of 3 to 15, by weight, is based upon the dry weight of the fiber.

In an effort to make the composite slurries of acrylic polymers, alpha-gypsum and natural cellulose fibers workable, it is preferred that a filler material, which is non-reactive with the other elements of the composites, be added. In practice it has been found that vermiculite is a preferred non-reactive filler, however, in some instances, other materials such as calcium carbonate, perlite or sand may be used. The filler materials are generally present in amounts of 1 to 10%, by weight, of the resultant composites, however, in some instances, it is possible that little or no filler could be utilized, however, the workability of such a composite would be severely compromised for molding purposes.

As previously discussed, the natural cellulose fibers are generally premixed with water. Normally, the water is added, to or present in the dry fiber in amounts, by weight, of 200 to 400% of the fiber.

In the preferred embodiment, the composites also include a hardening agent and a melamine resin which interact with the acrylic polymer. It is foreseen that in some instances, the melamine resin and hardening agent would not be utilized if the end product to be molded from the polymeric resin composite is to be utilized in protected areas such as for interior veneers which would not be subject to moisture. However, in the preferred embodiment, and in order to make the resultant veneers and other structures water resistant, the melamine resin and hardening agents are added. Generally, the hardening agent which may be a chemical agent such as ammonium chloride is added in amounts equal to approximately 5% of the weight of melamine resin added to the composite. The melamine resin is generally present in amounts between 0 to 10%, and preferably between 3 to 5%. The melamine resin may be a melamine formaldehyde resin such as Cymel 405. Other types of agents incorporating preservatives other than formaldehyde may be interchanged for the melamine resin. The amount of hardening agent could be increased, however, there would be no resultant effect on the composites with the exception of perhaps accelerating the setting time of the composites. For these reasons, the hardening agent is generally maintained at a 5% ratio with the amount of melamine resin added.

The following examples set forth low, high and generally preferred ranges for each of the elements of the composites of the present invention. Again, in some examples, the melamine resin and hardening agent will not be utilized as the end product may not require water resistance which is afforded by those elements.

|  | COMPOSITES WEIGHT IN POUNDS | | | | |
| --- | --- | --- | --- | --- | --- |
|  | A | B | C | D | E |
| ACRYLIC POLYMER (Forton VF 812-50% Solids in emulsion) | 3.0 | 10.0 | 7.0 | 3.0 | 10.0 |
| ALPHA HEMIHYDRATE GYPSUM (FGR) | 10.0 | 10.0 | 10.0 | 10.0 | 10.0 |
| NATURAL CELLULOSE FIBERS | .20 | 2.0 | 1.0 | .20 | 2.0 |
| WATER (additional) | .40 | 4.0 | 2.0 | .40 | 4.0 |
| FILLER (Vermiculite) | .2 | 2.5 | 0.5 | .20 | 2.5 |
| MELAMINE RESIN (Cymel 405) | 0 | 0 | 1.0 | .50 | 2.0 |
| HARDENING AGENT (Ammonium Chloride) | 0 | 0 | 0.2 | .024 | .34 |

A. Moldable acrylic polymer composite exhibiting reduced water repellency (interior use anticipated) when molded to form veneer panels, preferred range of fiber/polymer present.
B. Moldable acrylic polymer composite exhibiting reduced water repellency (interior use anticipated) when molded to form veneer panels, high range of fiber/polymer present.
C. Moldable acrylic polymer composite exhibiting good water repellency (both interior and exterior uses anticipated) when molded to form veneer panels, low range of fiber/polymer present.
D. Moldable acrylic polymer composite exhibiting good water repellency (both interior and exterior uses anticipated) when molded to form veneer panels, preferred range of fiber/polymer present.
E. Moldable acrylic polymer composite exhibiting good water repellency (both interior and exterior uses anticipated) when molded to form veneer panels, high range of fiber/polymer present.

The composites of the present invention are capable of being molded either manually, by spraying, pouring, pumping, or by hand lamination. Various coloring agents may be added to the composites so that the final molded products will simulate natural surface characteristics of quarried rocks of different types including limestone, natural travertine, coral, dolomite and the like. In the preferred embodiment, the cellulose fibers are soaked with a mixture of the acrylic polymers and additional water so that the fibers are well soaked and impregnated with the acrylic material. This will insure that the fibers do not break down over a period of time within the molded product. The color is generally added to the soaking fiber and polymer resin and chemical retardants or accelerators to adjust molding reaction times may also be utilized. The presoaked fibers are then blended with the melamine resin, the hardening agent, gypsum and the filler insuring that the overall composites are well mixed before being introduced into molds.

The resulting mixtures or composites may be poured by hand, pumped or sprayed into open or double wall molds. Some vibration of the molds may be necessary or the material within the mold may be tamped in order to insure the removal of entrapped air. The composites may also be applied by hand to build up thicknesses in complex molds.

The composites of the present invention generally are ready for de-molding within a period of approximately 1½ hours following the initial mixing. Accelerators may be added to the composite slurry in order to speed up hardening times. Gypsum accelerators including terra alba and ammonium sulfate may be used.

Because of the tensile strength of the products molded utilizing the composites of the present invention, enlarged surface veneer panels may be easily handled and mounted without fear of fracturing or shattering. Further, the composite materials, when molded, are fastenable utilizing conventional fasteners including screws and/or nails without the products cracking at the point of entry of the fasteners. In addition to the foregoing, due to inherent strength of the molded material, reinforcing frames or backing structures are generally not necessary and the panels and veneers may be attached directly to substructure framing, wall studding and the like. The composites may also be molded into self-supporting objects such as freestanding planters, shelves and the like.

I claim:

1. Moldable structural building material composite comprising:
    an acrylic polymer emulsion including 30-70% polymer solids in solution, said polymer emulsion being present in the composite in an amount between approximately 19 to 35%, by weight;
    an alpha-gypsum present in the composite in an amount between approximately 35 to 71%, by weight;
    natural cellulose fibers present in the composite in an amount of between approximately 3 to 15%, by dry weight of the fiber; and
    water in an amount of between approximately 200-400%, by weight of the fibers.

2. The moldable composite of claim 1 further comprising a melamine resin present in an amount of up to approximately 10%, by weight of the composite, and a hardening agent.

3. The composite of claim 2 in which said melamine resin comprises between approximately 3-5%, by weight, of the composite.

4. The composite of claim 2 in which the hardening agent is ammonium chloride.

5. The composite of claim 2 in which the hardening agent is present in the composite in an amount equal to approximately 5.0% of the weight of the melamine resin.

6. The composite of claim 1, further comprising a non-reactive filler selected from a group consisting of vermiculite, sand, calcium, carbonate and perlite.

7. The composite of claim 1 in which the fibers are between 0.25 to 1.5 inches in length.

8. The composite of claim 7 in which the fibers are selected from a group of virgin and recycled fibers consisting of wood, paper, and cotton and other vegetable fibers.

9. The composite of claim 1 in which the fibers are soaked with water and said acrylic polymer before being blended into the composite.

10. The composite of claim 9 further comprising a coloring agent.

11. A moldable structural building material composite comprising:
    an acrylic polymer emulsion including 30-70% polymer solids in a water base solution, said polymer emulsion being present in the composite in an amount between approximately 19 to 35%, by weight;
    an alpha-gypsum present in the composite in an amount between approximately 35 to 71%, by weight;
    a melamine resin present in an amount of up to approximately 10%, by weight of the composite;
    a hardening agent present in the composite in an amount of at least approximately 5.0%, by weight of the melamine resin;
    natural cellular fibers present in the composite in an amount of between approximately 3 to 15%, by dry weight of the fiber;
    a non-reactive filler; and
    water in an amount of between approximately 200-400%, by weight of the fiber.

12. The composite of claim 11 in which said melamine resin comprises between approximately 3-5%, by weight, of the composite.

13. The composite of claim 11 in which the non-reactive filler is selected from a group consisting of vermiculite, sand, calcium carbonate and perlite.

14. The composite of claim 13 in which the filler is present in an amount of from 1.0 to 10.0%, by weight.

15. The composite of claim 11 in which the fibers are selected from a group of virgin and recycled fibers consisting of wood, paper, and cotton and other vegetable fibers.

16. The composite of claim 11 in which the hardening agent is ammonium chloride.

17. The composite of claim 11 in which said emulsion includes 50.0% polymer solids.

18. The composite of claim 17 further comprising a coloring agent.

19. The composite of claim 1, wherein the cellulose fibers are present in the composite in an amount of between approximately 5 to 12%, by dry weight of the fiber.

20. The composite of claim 11, wherein the cellulose fibers are present in the composite in an amount of between approximately 5 to 12%, by dry weight of the fiber.

* * * * *